United States Patent [19]

Ambrogi

[11] Patent Number: 4,457,771

[45] Date of Patent: Jul. 3, 1984

[54] FORMING LAMINATED ARTICLES FROM A COMPOSITE ENCAPSULATED CHARGE OF MOLTEN GLASS

[75] Inventor: Raymond R. Ambrogi, Corning, N.Y.

[73] Assignee: Corning Glass Works, Corning, N.Y.

[21] Appl. No.: 461,613

[22] Filed: Jan. 27, 1983

Related U.S. Application Data

[63] Continuation of Ser. No. 259,493, May 1, 1981, abandoned.

[51] Int. Cl.³ .................... C03B 17/00; C03B 7/00
[52] U.S. Cl. ................................ 65/66; 65/121; 65/127; 65/129; 65/130; 264/148
[58] Field of Search .............. 65/66, 126, 121, 130, 65/127, 129, 132, 133, 145, 329, 3.13, 77, 78, 79, 80, 75; 264/171, 148; 425/133.1

[56] References Cited

U.S. PATENT DOCUMENTS

| 1,529,947 | 3/1925 | Freese | 65/121 |
|---|---|---|---|
| 1,998,616 | 4/1935 | Hamilton | 65/130 |
| 2,013,451 | 9/1935 | Stewart | 65/130 |
| 2,020,143 | 11/1935 | Haub | 65/130 |
| 2,033,959 | 3/1936 | Stuckey | 65/130 |
| 2,500,105 | 3/1950 | Weber | 65/121 X |
| 2,992,517 | 7/1961 | Hicks, Jr. | 65/11.1 X |
| 3,351,449 | 11/1967 | Ambrogi | 65/122 |
| 3,541,198 | 11/1970 | Ueda et al. | 264/171 |
| 3,582,306 | 6/1971 | Giffen | 65/121 |
| 3,582,454 | 6/1971 | Giffen | 65/177 X |
| 3,673,049 | 6/1972 | Giffen et al. | 65/121 |
| 3,807,919 | 4/1974 | Kaufman et al. | 425/133.1 |
| 3,947,178 | 3/1976 | Belshaw et al. | 425/133.1 |
| 4,023,953 | 5/1977 | Megles, Jr. et al. | 65/121 |
| 4,381,932 | 5/1983 | Olson et al. | 65/121 X |

Primary Examiner—Kenneth M. Schor
Attorney, Agent, or Firm—B. R. Turner

[57] ABSTRACT

A method is set forth for forming laminated articles such as by pressing, blowing, and press and blow techniques, directly from a composite gob of molten glass having an inner core of one glass and an outer skin of a second glass. A charge of molten core glass is delivered from one supply of molten glass and a charge of molten skin glass from a separate supply is simultaneously delivered so as to surround the core glass. The composite charge is severed from their separate supplies so as to form a discrete composite gob of molten glass having a core glass encapsulated within a skin glass. The discrete composite charge of molten glass is delivered to a forming mold wherein a positive force such as pressing and/or blowing is applied to said charge of molten glass within the mold to form a laminated article having a core of one glass which is completely surrounded by a skin of a second glass.

2 Claims, 8 Drawing Figures

FORMING LAMINATED ARTICLES FROM A COMPOSITE ENCAPSULATED CHARGE OF MOLTEN GLASS

This is a continuation, of application Ser. No. 259,493, filed May 1, 1981 and now abandoned.

BACKGROUND OF THE INVENTION

For some time now it has been possible for manufacturers of glass articles to form laminated articles, such as laminated tubing and laminated sheet glass wherein a continuous flow or stream of the composite glass is delivered to form such tubing or sheet as desired. U.S. Pat. Nos. 2,992,517 and 3,541,198 illustrate processes of forming continuous composite filaments, whereas U.S. Pat. No. 4,023,953 illustrates method and apparatus for continuously producing composite glass tubing. In the manufacture of both the filaments and the tubing, a continuous glass flow of the composite streams is necessary in order to form such filaments or tubing.

U.S. Pat. No. 3,582,306 sets forth method and apparatus for continuously forming a composite sheet or ribbon of molten glass directly from a plurality of flows of molten vitreous material, whereas U.S. Pat. No. 3,582,454 discloses method and apparatus for forming articles from such a continuous sheet of such composite material. In other words, molten glass is delivered to first form a continuous composite sheet of molten glass which is then subsequently formed and trimmed into various articles. U.S. Pat. No. 3,673,049 sets forth a plurality of compositions which may be utilized for forming both the composite sheet of the prior art and the composite encapsulated charge of molten glass of the present invention.

Whereas the prior art related to the formation of composite articles, such as tubing and sheet from a continuous flow of a composite glass, the present invention relates to the formation of individual articles from a discrete composite charge of molten glass having a core glass fully encapsulated within a skin glass, wherein the composite encapsulated charge of molten glass may be pressed and/or blown into a laminated article having a core of one glass which is completely surrounded by a skin of a second glass. The use of stream feeding for forming individual charges of a single glass is shown in U.S. Pat. No. 3,351,449, however, the patent does not contemplate composite charges or the formation of laminated ware. The applicant recognizes many applications for such pressed or blown laminated ware which were not heretofore feasibly formable with the known technologies. For example, pressed and/or blown articles may be formed with a core glass of a nondurable opal composition which is provided with a durable skin glass having a desired decoration or tinting. In a like manner, the charge having a core of an inexpensive glass could be encapsulated with a skin of photochromic glass which is pressed or formed into a laminated article having the core of the inexpensive glass completely surrounded by a skin of the photochromic glass. Further, by utilizing glass compositions disclosed in U.S. Pat. No. 3,673,049, the core and skin glasses may be chosen so as to provide a strengthened blown or pressed laminated article having a compressive outer skin.

In addition to the formation of laminated tubing and sheet glass as shown in the aforementioned prior art, it has been known to combine multiple flows of molten glass so as to make variegated glasses used for the manufacture of variegated glass marbles as shown in U.S. Pat. No. 1,529,947. However, the process as shown in such patent was merely to combine two glasses of different colors, shear the depending glass into gobs and deposit the variegated glass in a mold for forming marbles. Although the patent indicates that a stream of glass of one color may be injected within the center of a flowing stream of glass of another color so as to form a solid tubular core of one color extending from the top to the bottom of the gob surrounded on its sidewalls with glass of another color and that the variegated glass may be formed into an article by any desired forming devices, the patent does not suggest or contemplate the formation of a discrete composite charge of molten glass having a core glass encapsulated within a skin glass, or the pressing and/or blowing of such composite encapsulated charge into a laminated article having a core of one glass which is completely surrounded by a skin of a second glass.

SUMMARY OF THE INVENTION

In its simplest form, the present invention sets forth a completely new concept in forming laminated articles having a core of one glass completely surrounded by a skin of a second glass. A discrete charge of molten glass is formed from a plurality of separate and distinct glasses in such a manner so that the discrete composite charge of molten glass has a core glass of one composition completely encapsulated within and surrounded by a skin glass of a second composition. The discrete composite charge of glass is delivered while in a molten condition to a mold or forming surface wherein a positive force is exerted thereon such as by pressing, blowing, or pressing and blowing so as to form a pressed and/or blown laminated article having a core of one glass which is completely surrounded by a skin of a second glass.

It thus has been an object of the present invention to expand upon the known technologies of forming laminated sheet glass and tubing so as to provide laminated pressed and/or blown ware in a manner not contemplated heretofore.

DESCRIPTION OF THE PREFERRED EMBODIMENTS

Figure 1:
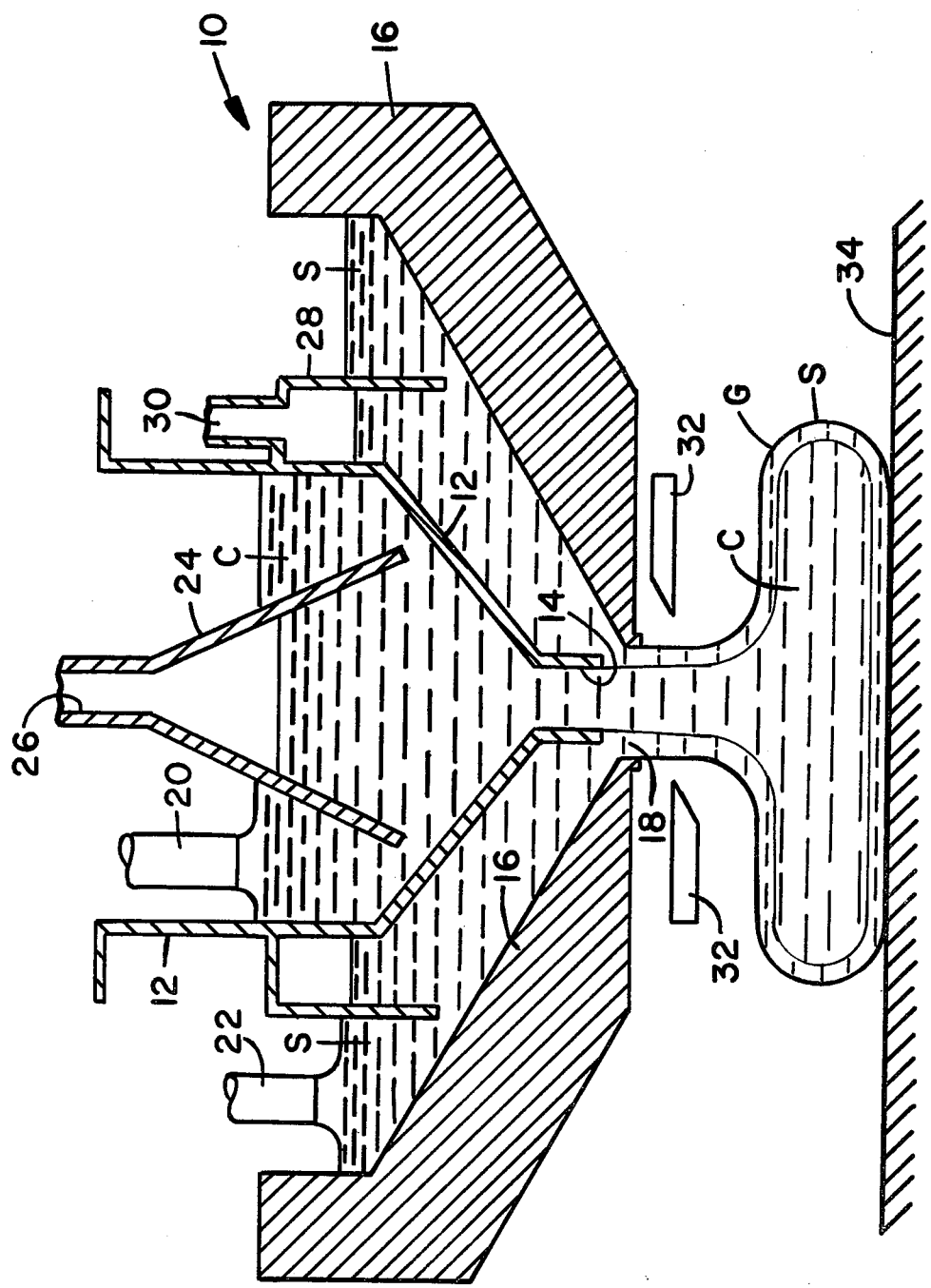
FIG. 1 is a somewhat schematic elevational view in section of an apparatus for forming a composite encapsulated charge of molten glass in accordance with the present invention.

Referring now to FIG. 1, a delivery apparatus 10 is shown for delivering discrete charges of molten glass G having a core glass C completely surrounded by and encapsulated within a skin glass S. The delivery apparatus 10 includes a central core glass container 12 having an orifice opening 14 and an outer skin glass container 16 having an orifice opening 18 concentric with but below the core glass central orifice opening 14. The central core glass container 12 is provided with suitable conduit means 20 for delivering molten core glass C from a suitable supply thereof such as a melting tank to the central container 12. In a like manner, the outer skin glass container 16 is provided with suitable conduit means 22 for supplying molten skin glass S from a supply thereof such as a melting tank to the outer container 16.

A pneumatic bell 24 is shown positioned within the central core glass container 12. The bell 24 is provided with pressure or vacuum as desired through an upper opening 26 in order to control flow of core glass through the central orifice opening 14. A slight suck-up of the core glass C within the orifice 14 of central container 12 at the end of each delivery cycle promotes the flow of skin glass S within outer container 16 below orifice 14 so as to facilitate the initial encapsulation of the core glass by the skin glass in the next delivery. If desired, a conventional vertically reciprocal needle could be positioned within the well of the core glass container 12 for controlling the flow of core glass C through the orifice 14. Similarly, flow control means such as a baffle 28, connected to a source of pressure or vacuum through opening 30, is shown positioned within the outer skin glass container 16 for controlling the flow of skin glass S through outer orifice opening 18 about central orifice opening 14, although a mechanical sleeve could be utilized for controlling the flow of skin glass if so desired. A pair of shear blades 32 are shown operatively positioned below the orifices of delivery apparatus 10 for shearing the delivery of molten glass therefrom to form a composite gob or charge G delivered to a forming surface 34.

In the delivery of molten glass from the delivery apparatus 10, a charge of molten core glass C is delivered from the central core glass container 12 through orifice 14 while simultaneously a charge of molten skin glass S, which surrounds the core glass C, is delivered from the supply of skin glass retained within skin glass container 16 through orifice 18. Since the orifice 18 is below orifice 14 and since orifice 14 is actually within skin glass container 16, the flow of skin glass S is initiated from orifice 18 prior to the flow of core glass C therethrough, to thus provide for the initial encapsulation and surrounding of the core glass C by the skin glass S within the charge or gob G. The composite charge of molten glass which emanates from the delivery apparatus 10 is delivered to a forming surface 34 which initially shapes the gob and is then sheared by shear blades 32 to form the discrete composite charge G of molten glass having a core glass C encapsulated within and completely surrounded by a skin glass S. As the flows of core glass C and skin glass S are sheared, severing the gob G from the delivery apparatus 10, the skin glass S is caused to simultaneously flow over the severed core glass C by the shearing action, so as to form a discrete composite charge of molten glass on forming surface 34, having a core of one glass encapsulated within and completely surrounded by a skin of a second glass.

Figure 2:
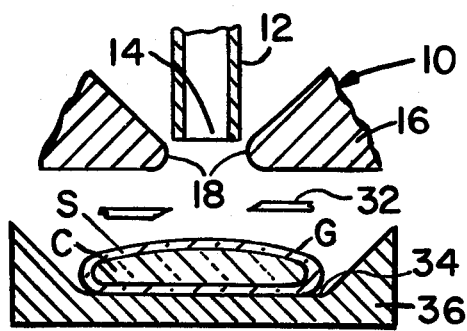
FIG. 2 is a schematic elevational view, partially in section, illustrating the loading of a discrete composite charge of molten glass into a pressing mold.
Figure 3:
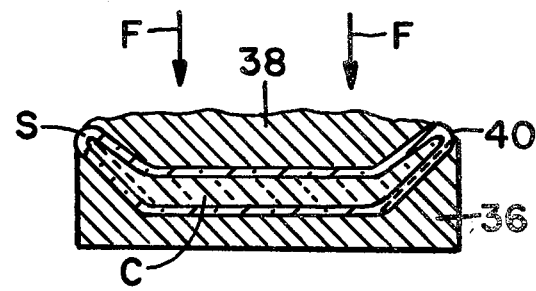
FIG. 3 is a schematic elevational view in section illustrating the pressing of the charge shown in FIG. 2 to form a laminated article having a core of one glass which is completely surrounded by a skin of a second glass.

Referring now to FIGS. 2 and 3, a discrete composite charge G of molten glass having a core glass C encapsulated within a skin glass S is shown in FIG. 2 as having been deposited upon a forming surface 34 of a pressing mold 36 from delivery apparatus 10. As shown in FIG. 3, a positive force F is exerted upon the charge of molten glass within the mold by a plunger 38 to press form a laminated article 40 having a core of core glass C which is completely surrounded by a skin of skin glass S.

Figure 4:
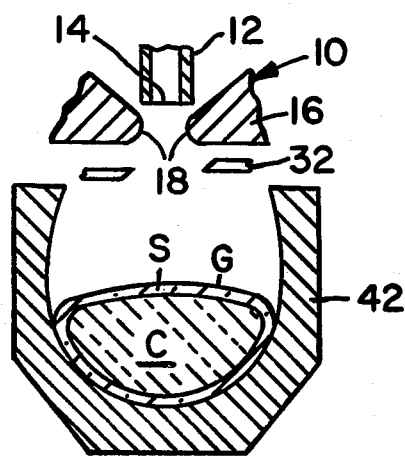
FIG. 4 is a schematic elevational view in section illustrating the delivering of a discrete composite charge of molten glass to a parison mold.
Figure 5:
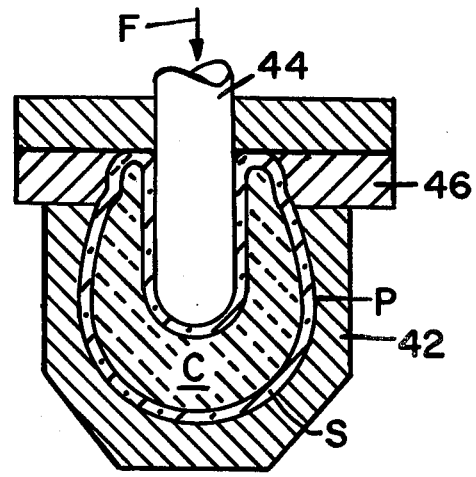
FIG. 5 is a schematic elevational view in section illustrating the pressing of a laminated parison from the composite charge as delivered in FIG. 4.
Figure 6:
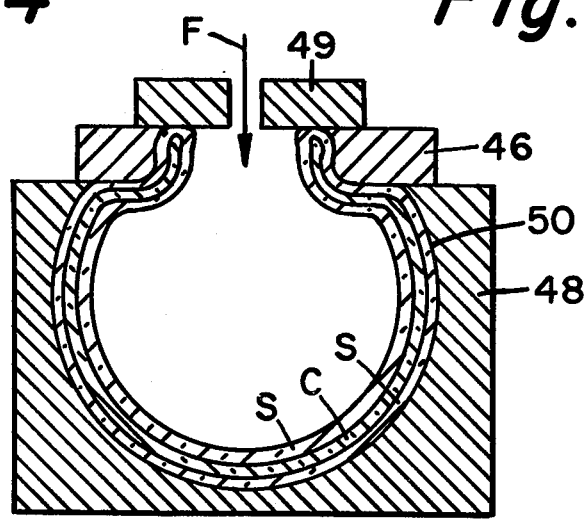
FIG. 6 is a schematic elevational view in section illustrating the blowing of the parison formed in FIG. 5 into a blown laminated article having a core of one glass which is completely surrounded by a skin of a second glass.

Referring now to FIGS. 4-6, a discrete composite charge G of molten glass having a core glass C encapsulated within a skin glass S is shown in FIG. 4 as having been delivered from delivery apparatus 10 to a parison mold 42. While in its molten condition, the composite charge is subjected to an initial force F to form a parison P within the mold 42 having a core glass C encapsulated within a skin glass S. The force utilized to form the parison may be in the form of a counter blow or a vacuum drawdown or an initial parison pressing by plunger 44 utilizing a neck ring 46. The parison is then transferred by neck ring 46 to a blow mold 48, and a blow head 49 engages therewith to supply a blowing force F for blowing the parison into a laminated blown article 50 having a core C of one glass which is completely surrounded by a skin S of a second glass. It will be understood that the thickness of the various skins is greatly enlarged for purposes of illustration.

Figure 7:
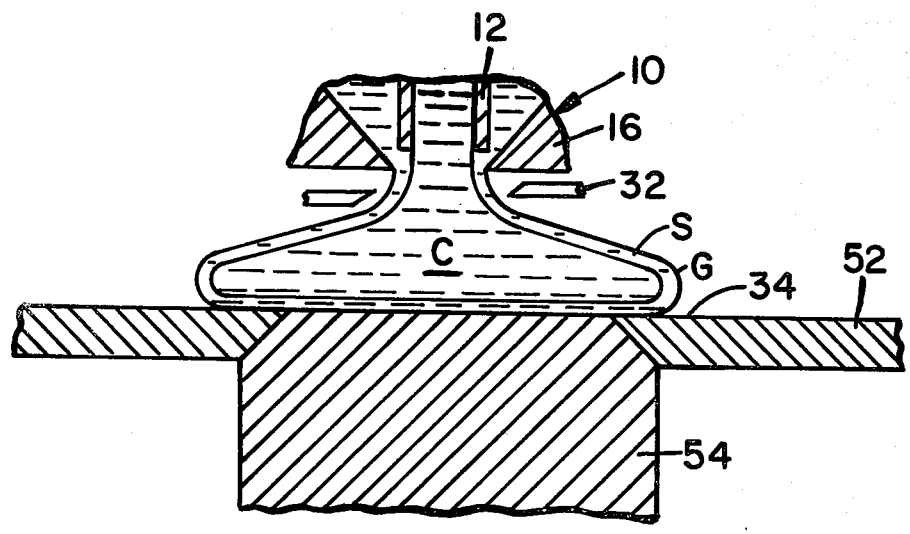
FIG. 7 is a schematic elevational view in section illustrating the delivering of a discrete composite charge of molten glass to a forming surface such as an orifice plate having a removable plug.
Figure 8:
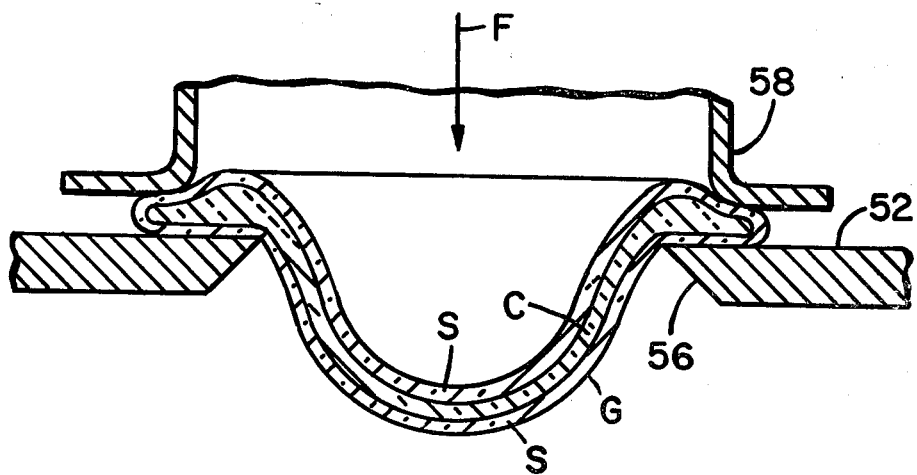
FIG. 8 is a schematic elevational view in section illustrating the sagging and initial blowing into a laminated article of the discrete composite charge delivered to the forming surface of FIG. 7 when the plug is removed.

Referring now to FIGS. 7 and 8, a composite charge of molten glass G having a core glass C surrounded by a skin glass S is shown being delivered by delivery apparatus 10 to a forming surface 34 of an orifice plate 52 having a removable plug 54 positioned therein. As shown in FIG. 8, the plug 54 is removed leaving an orifice 56 through which the composite charge G is blown by means of force F delivered by a blow head 58 into a final blown laminated article having a core of one glass which is completely surrounded by a skin of another glass. Although not shown, a suitable blow mold may engage with the orifice plate 52 as is customary in the art for forming the final blown article.

It thus can be seen from the foregoing description that the present invention sets forth a novel method of forming laminated articles having a core of one glass which is completely surrounded by a skin of a second glass, by a variety of forming techniques including pressing, blowing, press and blow, blow and blow and even conventional spinning or centrifical techniques. The provision of such a laminated article through the various forming techniques is accomplished by the delivery of a discrete composite charge of molten glass having a core glass of one composition encapsulated within and completely surrounded by a skin glass of a second composition to a forming surface, and while such charge is still in a molten condition, forming such charge into a finished laminated article having a core of one glass which is completely surrounded by a skin of a second glass.

Although the preferred embodiments have been disclosed herein, it is appreciated that various changes and modifications may be made thereto without departing from the spirit and scope of the invention as set forth in the appended claims.

I claim:

1. A method of forming a laminated article from a discrete composite charge of molten glass which method (1) comprises initially delivering a charge of molten skin glass downwardly through means defining a first stationary orifice from a supply of said skin glass, (2) delivering a charge of molten core glass centrally of said skin glass downwardly though means defining a separate fixed orifice positioned coaxially with and above said first stationary orifice, said molten core glass being delivered from a supply of said core glass which is separated from said supply of skin glass, (3) surrounding the core glass with the skin glass while simultaneously delivering both glasses from said first stationary orifice, (4) pneumatically controlling the delivery of said skin glass downwardly through said first stationary orifice by regulating the amount and direction of pressure forces applied to the supply of said skin glass, (5) pneumatically controlling the delivery of said core glass downwardly through said orifices by varying upward and downward pressure forces exerted in said separate supply of core glass, (6) severing the delivered combined charge of skin and core glass from said supply of skin glass and core glass and simultaneously completely surrounding said core glass with said skin glass to form a discrete composite charge of molten glass having a core glass encapsulated within a skin glass, (7) delivering said composite charge of molten glass to a molding surface, and (8) exerting a positive force on said discrete charge of molten glass to form a laminated article having a core of one glass which is completely surrounded by a skin of a second glass.

2. A method of directly forming a laminated article from a discrete charge of molten glass which comprises, method (1) flowing an outer flow of skin glass of one composition from means defining a first stationary delivery orifice, (2) flowing a separate central flow of molten core glass of a second composition from means defining a second fixed delivery orifice positioned concentric with and above said first stationary orifice, (3) maintaining supplies of said skin glass and said core glass separate from one another above said delivery orifices in separate containers, (4) simultaneously delivering said flow of molten skin glass and said separate flow of core glass from said first stationary delivery orifice, (5) initiating the flow of skin glass from said first orifice prior to flowing core glass through said first orifice, (6) surrounding said flow of core glass with said flow of skin glass as said separate flows are combined and simultaneously delivered from said first stationary orifice to form a molten composite charge, (7) pneumatically controlling the flow of said skin glass from said first stationary orifice by regulating pressure forces applied to said supply of skin glass within its container, (8) pneumatically controlling the flow of said core glass from said first and second orifices by exerting upward and downward pressure forces in the supply of said core glass within its container, (9) severing the delivered glass flows from the molten glass exiting from said first stationary orifice while simultaneously causing said skin glass of said charge to overlie the severed core glass of said charge so as to form a discrete composite charge having the molten core glass completely surrounded by the molten skin glass, (10) delivering said molten composite charge to a forming surface, and (11) applying external force to said delivered discrete composite charge of molten glass so as to form such charge while still in a molten condition into a final laminated glass article having a skin of one composition surrounded by a core of a second composition.

* * * * *

UNITED STATES PATENT AND TRADEMARK OFFICE
CERTIFICATE OF CORRECTION

PATENT NO. : 4,457,771
DATED : July 3, 1984
INVENTOR(S) : Raymond R. Ambrogi

It is certified that error appears in the above-identified patent and that said Letters Patent is hereby corrected as shown below:

Column 5, line 11, "method (1) comprises" should read -- method comprises, (1) --.

Column 6, lines 2 and 3, "which comprises method (1)" should read -- which method comprises, (1) --.

Signed and Sealed this

Twentieth Day of November 1984

[SEAL]

Attest:

GERALD J. MOSSINGHOFF

Attesting Officer  Commissioner of Patents and Trademarks